United States Patent [19]

Witt et al.

[11] Patent Number: 5,561,170
[45] Date of Patent: Oct. 1, 1996

[54] PREPARATION OF EXPANDABLE THERMOPLASTIC POLYMERS BY POST-IMPREGNATION

[75] Inventors: Michael Witt, Ludwigshafen; Klaus Hahn, Kirchheim; Maria Lorenz, Ludwigshafen, all of Germany

[73] Assignee: BASF Aktiengesellschaft, Ludwigshafen, Germany

[21] Appl. No.: 426,475

[22] Filed: Apr. 20, 1995

Related U.S. Application Data

[63] Continuation of Ser. No. 77,367, Jun. 17, 1993, abandoned.

[30] Foreign Application Priority Data

Jun. 20, 1993 [DE] Germany ............... 42 20 242.6

[51] Int. Cl.$^6$ ...................... C08J 9/28
[52] U.S. Cl. ............... 521/65; 521/72; 521/85; 521/89; 521/107; 521/108; 521/120; 521/121; 521/143; 521/146
[58] Field of Search .............. 521/65, 72, 85, 521/89, 107, 108, 120, 121, 143, 146

[56] References Cited

FOREIGN PATENT DOCUMENTS 0095109  11/1983  European Pat. Off. .
186988  7/1986  European Pat. Off. .

OTHER PUBLICATIONS

Database WPIL, Derwent Publications, AN 77–67319Y[38] (English language abstract of JP50 109 966) Aug. 1975.

Patent Abstracts of Japan, vol. 12, No. 410 (C–540) Oct. 28, 1988 (English abstract of JP 63 146 944).

*Primary Examiner*—James J. Seidleck
*Assistant Examiner*—John M. Cooney, Jr.
*Attorney, Agent, or Firm*—Keil & Weinkauf

[57] ABSTRACT

A process for the preparation of expandable thermoplastic polymers by post-impregnation with a blowing agent in aqueous suspension in the presence of a mixture of magnesium pyrophosphate and a sulfonate group-containing extender as suspension stabilizer, in a reactor comprises a) preparing the magnesium pyrophosphate in the same reactor at below 50° C. by adding a solid magnesium salt in an amount corresponding to an at least 3% stoichiometric excess, based on pyrophosphate, to an aqueous solution of the pyrophosphate, b) heating the suspension medium to from 70° to 140° C. and c) adding the blowing agent in this temperature range.

7 Claims, No Drawings

PREPARATION OF EXPANDABLE THERMOPLASTIC POLYMERS BY POST-IMPREGNATION

This application is a continuation of application Ser. No. 08/077,367, filed on Jun. 17, 1993, now abandoned.

The present invention relates to a process for the preparation of expandable thermoplastic polymers by post-impregnation with a blowing agent in aqueous suspension in the presence of a mixture of magnesium pyrophosphate and a sulfonate group-containing extender as suspension stabilizer (also referred to as dispersant) in a reactor.

DE-A 25 34 833 and DE-A 26 21 448 discloses processes for the preparation of spherical expandable styrene polymers in which strand-pelletized particles are suspended in water in a pressure reactor in the presence of an organic or inorganic suspension stabilizer or a mixture thereof, and are treated for up to 5 hours at above the softening point at a pressure of up to 14 bar.

The suspension stabilizers usually used here, in addition to molecular colloids, such as polyvinyl alcohol (PVA) and polyvinylpyrrolidone (PVP), are low-solubility salts, such as $Ca_3(PO_4)_2$ (known as Pickering salts) in combination with an extender, such as dodecyl benzenesulfonate.

Extenders here are taken to mean compounds which increase the ability of the low-solubility, inorganic compounds to stabilize suspensions. The extenders cause the inorganic Pickering salt, which is hydrophilic per se, to become partly hydrophobic.

EP-B 95 109 discloses a process for the production of expanded particles of a polyolefin resin. The polyolefin particles and a volatile blowing agent are dispersed in water in the presence of a dispersant in a pressure-tight vessel. The mixture is heated and subsequently foamed by transfer into a low-pressure atmosphere. Examples of dispersants which can be used are fine powders of inorganic substances which have low solubility in water, such as calcium phosphate, magnesium pyrophosphate and zinc carbonate. It is also possible to use mixtures of these fine powders with a small amount of a sodium alkylbenzenesulfonate, sodium α-olefinsulfonate, sodium alkylsulfonate or a similar anionic, surface-active compound.

It has been found that many substances which are known as dispersants are not suitable in the processes for the preparation of expandable or expanded thermoplastic polymers.

For example, our own studies have shown that use of commercially available magnesium pyrophosphate in the known processes for the preparation of expandable styrene polymers generally results in coagulation of the batches.

In addition, many suspension stabilizers prove to be unsuitable if particles of recycled material, as produced, for example, in the recycling of polystyrene foams by melting and degassing in an extruder followed by granulation, are employed in the processes for the preparation of expandable thermoplastic polymers.

The additives added to the thermoplastic polymer are generally present in the recycled material in various types and amounts. In addition, the recycled material may contain impurities. These additives and impurities frequently prevent or hinder the preparation of expandable thermoplastic polymers in the known processes.

It is an object of the present invention to provide a process for the preparation of expandable thermoplastic polymers which does not have the outlined disadvantages.

We found that, surprisingly, this object is achieved by a process for the preparation of expandable, thermoplastic polymers by post-impregnation with a blowing agent in aqueous suspension in the presence of a mixture of magnesium pyrophosphate and a sulfonate group-containing extender as suspension stabilizer, in a reactor, which comprises a) preparing the magnesium pyrophosphate in the same reactor at below 50° C. by adding a solid magnesium salt in an amount corresponding to an at least 3% stoichiometric excess, based on pyrophosphate, to an aqueous solution of the pyrophosphate, b) heating the suspension medium to from 70° to 140° C. and c) adding the blowing agent in this temperature range.

For the purposes of the present invention, thermoplastic polymers are, for example, polyolefins or polyvinylaromatic compounds. Preference is given in the invention to polyvinylaromatic compounds, such as styrene polymers.

The thermoplastic polymers are generally employed in the process according to the invention in the form of particles. In general, granules or suspension polymers having particle weights of from 0.5 to 50 mg/particle are employed.

For the purposes of the present invention, polyolefins are crystalline olefin polymers whose X-ray crystallinity at 25° C. is greater than 25%. Suitable polyolefins for the process are low-, medium- and high-density polyethylenes, for example having a density of from 0.916 to 0.965 g/cm$^3$, preferably from 0.920 to 0.935 g/cm$^3$, as prepared by high-, low- and medium-pressure processes, polypropylene and ethylene and propylene copolymers containing at least 50 mol % of ethylene and/or propylene units. Examples of suitable comonomers are α-alkenes having up to 12 carbon atoms, such as propylene, butene, pentene, hexene and octene, furthermore vinyl esters, such as vinyl acetate, esters of acrylic acid, methacrylic acid, maleic acid or fumaric acid with alcohols containing 1 to 8 carbon atoms. The polyolefins generally have a melt flow index MFI (230, 2.16) (measured in accordance with DIN 53 735) of from 0.5 to 15, preferably from 1 to 12, and a melting range of from 100° to 170° C., and a shear viscosity of from $1\times10^3$ to $1\times10^6$, measured in a rotational viscometer at 150° C. and an angular frequency of from $10^{-2}$ to $10^2 s^{-1}$. Mixtures of different polyolefins can also be used.

Preference is given to ethylene-propylene copolymers and copolymers of ethylene, propylene and a $C_4$- to $C_8$-α-olefin.

Particularly preferred ethylene-propylene copolymers comprise from 0.5 to 6% by weight of ethylene and from 94 to 99.5% by weight of propylene.

Particularly preferred copolymers of ethylene, propylene and a $C_4$- to $C_8$-α-olefin comprise from 0.5 to 6% by weight, preferably from 1 to 6% by weight, in particular from 1.5 to 6% by weight, of ethylene, from 88 to 99% by weight, preferably from 89 to 98% by weight, in particular from 90 to 97% by weight, of propylene and from 0.5 to 6% by weight, preferably from 1 to 6% by weight, in particular from 1 to 5% by weight, of a $C_4$- to $C_8$-α-olefin, such as 1-butene, 1-pentene, 1-hexene, 1-heptene or 1-octene. The copolymers should have a torsion modulus of from 100 to 800 N/mm$^2$, preferably from 100 to 700 N/mm$^2$, in particular from 150 to 600 N/mm$^2$.

For the purposes of the present invention, styrene polymers are polystyrene and copolymers of styrene with other α,β-olefinically unsaturated compounds containing at least 50 parts by weight of styrene in copolymerized form. Examples of suitable comonomers in the process according to the invention are therefore α-methylstyrene, ring-halogenated styrenes, ring-alkylated styrenes, acrylonitrile, esters of acrylic or methacrylic acid with alcohols having 1 to 8 carbon atoms, N-vinyl compounds, such as vinylcarbazole, or alternatively small amounts of compounds which contain two polymerizable double bonds, such as butadiene, divinylbenzene or butanediol diacrylate.

The styrene polymers may also contain other conventional additives which provide the expandable products with certain properties. Examples which may be mentioned are flameproofing agents based on organic bromine or chlorine compounds, such as trisdibromopropyl phosphate, hexabromocyclododecane, chorinated paraffin, and synergists for flameproofing agents, such as dicumyl peroxide and highly unstable organic peroxides; furthermore antistatics, stabilizers, dyes, lubricants, fillers and substances which have an antiadhesive action during prefoaming, such as zinc stearate, melamine-formaldehyde condensates or silica, and agents for shortening the demolding time during final foaming, eg. glycerol esters or hydroxycarboxylic acid esters. Depending on the intended action, the additives can be homogeneously distributed in the particles or in the form of a surface coating. Accordingly, the additives are added in the process according to the invention or subsequently applied to the expandable styrene polymers prepared according to the invention.

The blowing agents employed in the process according to the invention are, based on the thermoplastic polymer, from 1 to 10% by weight, preferably from 3 to 8% by weight, of a $C_3$- to $C_9$-hydrocarbon (such as propane, butane, isobutane, n-pentane, i-pentane, neopentane and/or hexane) and/or carbon dioxide.

If carbon dioxide is used as the blowing agent or as a constituent of the blowing agent, the thermoplastic polymer preferably contains a carbon dioxide absorber, as described in German Patent Application P 41 37 405.3.

It is essential to the invention that the magnesium pyrophosphate is prepared in the same reactor in which the post-impregnation is carried out, at below 50° C. by adding a solid magnesium salt in an amount corresponding to an at least 3% stoichiometric excess, based on pyrophosphate, to an aqueous solution of the pyrophosphate. The magnesium salt is preferably employed in an amount corresponding to an at least 5%, particularly preferably an at least 10% stoichiometric excess, based on pyrophosphate.

The formation of magnesium pyrophosphate is preferably carried out by adding solid $MgSO_4.7H_2O$ to a solution of $Na_4P_2O_7$.

Magnesium pyrophosphate is generally employed in the process according to the invention in a concentration of from 0.05 to 2.0% by weight, preferably from 0.1 to 1.0% by weight, particularly preferably from 0.2 to 0.5% by weight, based on the aqueous phase.

Sulfonate group-containing extenders are employed in the process according to the invention. These extenders include, for example, sodium dodecylbenzenesulfonate, long-chain alkylsulfonates, vinyl sulfonate and diisobutyl naphthalenesulfonate.

Preferred extenders are alkali metal salts of dodecylbenzenesulfonic acid and/or alkali metal salts of a mixture of $C_{12}$–$C_{17}$-alkylsulfonic acids. A particularly suitable mixture of $C_{12}$–$C_{17}$-alkylsulfonates comprises sodium alkylsulfonates, predominantly secondary, having a mean chain length of 15 carbon atoms and containing up to 0.2% by weight of organically bonded chlorine. A mixture of this type is marketed by Bayer AG under the name Mersolat®K 30.

The extenders are generally employed in amounts of from 2 to 20% by weight, preferably from 3 to 7% by weight, based on magnesium pyrophosphate.

In the process according to the invention, the suspension medium, after the magnesium pyrophosphate has been prepared in situ, is heated to from 70° to 140° C.

It is essential to the invention that the blowing agent is added in this temperature range. The blowing agent is preferably added when the temperature in the reactor is from 100° to 140° C.

The impregnation with the blowing agent is carried out in a manner known per se (cf. DE-A 25 34 833, DE-A 26 21 448, EP-A 53 333 and EP-B 95 109) by keeping the thermoplastic polymer in the region of the softening point for a certain period in the presence of the blowing agent.

After the reactor contents have been cooled, the resultant expandable thermoplastic polymers can be isolated and further processed in a known manner.

The blowing agent-containing styrene polymer particles prepared according to the invention generally have a diameter of from 0.2 to 4 mm. They can be prefoamed by conventional methods, for example using steam, to give foam particles having a diameter of from 0.1 to 2 cm and a bulk density of from 0.005 to 0.1 $g/cm^3$.

If the thermoplastic polymers used are polyolefins, the expandable particles are generally not isolated. The blowing agent-containing polyolefin particles are instead generally formed, without prior cooling of the reactor contents, by transfer into a low-pressure atmosphere to give prefoamed particles.

The prefoamed particles can then be foamed to completion by conventional methods to give foam-moldings having a density of from 0.005 to 0.1 $g/cm^3$.

The process according to the invention has numerous advantages. It has been found to be very insensitive to additives and/or impurities in the thermoplastic polymer. The process is not accompanied by coagulation of the batch, and very few agglomerates of two or more particles form. The resultant expandable thermoplastic polymer has a virtually ideal spherical shape and very good processing properties. During further processing, it is not necessary, for example, to wash off the suspension stabilizer by an acid wash, as is necessary, for example, in the case of calcium phosphate.

In the examples, parts and percentages are by weight.

EXAMPLE AND COMPARATIVE EXAMPLES 1 TO 6

EXAMPLE 25 l of water were introduced into a reactor having a capacity of 50 l. 90.5 g of $Na_4P_2O_7$ in solid form were added and dissolved by stirring for 10 minutes. 185 g of $MgSO_4.7H_2O$ were then added, and the mixture was stirred for a further 10 minutes. 450 g of a 1% strength solution of a mixture of $C_{12}$–$C_{17}$-alkylsulfonates comprising sodium alkylsulfonates, predominantly secondary, having a mean chain length of 15 carbon atoms (Mersolat®K 30 from Bayer AG) and 14 kg of the polystyrene granules to be impregnated with the blowing agent (particle weight from 0.5 to 50 mg) were then added. The reactor was tightly sealed, and the contents were warmed from 25° to 100° C. over the course of 4 hours and then to 125° C. over the course of 4 hours, and were then kept at this temperature for 4 hours. When the reactor internal temperature had reached 108° C., 930 g of pentane were metered in.

The reactor contents were cooled and filtered, and the blowing agent-containing polystyrene particles obtained were isolated.

There was no coagulation of two or more particles. The particles also had an ideal spherical shape.

Comparative Example 1

The procedure was similar to that described in the example, but the blowing agent was introduced into the reactor at the beginning. The batch coagulated, meaning that it was impossible to prepare blowing agent-containing polystyrene particles.

Comparative Example 2

The procedure was similar to that described in the example, but 167.8 g of $MgSO_4.H_2O$, ie. a stoichiometric amount of the magnesium salt, were used. The batch coagulated, meaning that it was impossible to prepare blowing agent-containing polystyrene particles.

Comparative Example 3

The procedure was similar to that described in the example, but magnesium pyrophosphate was prepared before commencement of the post-impregnation outside the reactor used for the post-impregnation, by combining aqueous solutions of $MgSO_4.7H_2O$ and $Na_4P_2O_7$. The magnesium pyrophosphate precipitated in this way was added to the batch in solid form.

The batch coagulated, meaning that it was impossible to prepare blowing agent-containing polystyrene particles.

Comparative Example 4

The procedure was similar to that described in the example, but 0.3% by weight, based on the aqueous phase, of calcium phosphate ($Ca_3(PO_4)_2$, TCP) was used. Many agglomerates were formed, and the resultant beads were highly deformed.

Comparative Examples 5 and 6

The procedure was similar to that described in the example, but 0.3% by weight, based on the aqueous phase, of commercial magnesium pyrophosphate from different producers (Comparative Examples 5 and 6) was used. In one case, the batch coagulated. In the other case, many agglomerates and highly deformed beads were observed.

We claim:

1. A process for the preparation of expandable thermoplastic styrene homopolymers polymers which comprises:
   a) preparing magnesium pyrophosphate in a reactor at below 50° C. by adding a solid magnesium salt to an aqueous solution of a pyrophosphate in the reactor, wherein the magnesium salt is in an amount corresponding to an at least 3% stoichiometric excess, based on the pyrophosphate to form a suspension medium containing magnesium pyrophosphate and excess magnesium;
   b) adding an extending agent containing at least one sulfonate group;
   c) adding styrene homopolymer;
   d) heating the suspension medium to from 70° to 140° C.;
   e) adding a blowing agent within this temperature range to produce a suspension containing thermoplastic particles impregnated with a blowing agent, magnesium pyrophosphate, excess magnesium and an extending agent containing at least one sulfonate group; and
   f) isolating the impregnated thermoplastic particles by cooling the suspension medium in the reactor and filtering the suspension medium.

2. A process as claimed in claim 1, wherein the blowing agent used is a $C_3$- to $C_9$-hydrocarbon and/or carbon dioxide.

3. A process as claimed in claim 1, wherein the magnesium salt used for the preparation of the magnesium pyrophosphate is employed in an amount corresponding to an at least 10% stoichiometric excess, based on the pyrophosphate.

4. A process as claimed in claim 1, wherein the blowing agent is added at from 100° to 140° C.

5. A process as claimed in claim 1, wherein the magnesium pyrophosphate content is from 0.05 to 2% by weight, based on the aqueous phase.

6. A process as claimed in claim 1, wherein the sulfonate group-containing extender is employed in an amount of from 2 to 20% by weight, based on magnesium pyrophosphate.

7. A process as claimed in claim 6, wherein the extender is employed in an amount of from 3 to 7% by weight, based on magnesium pyrophosphate.

* * * * *

UNITED STATES PATENT AND TRADEMARK OFFICE
CERTIFICATE OF CORRECTION

PATENT NO.: 5,561,170

DATED: October 1, 1996

INVENTOR(S): WITT et al.

It is certified that error appears in the above-identified patent and that said Letters Patent is hereby corrected as shown below:

On the cover page, item [30], the foreign application priority date "June 20, 1993" should be --June 20, 1992--.

Signed and Sealed this

Twenty-fourth Day of December, 1996

Attest:

BRUCE LEHMAN

*Attesting Officer*            *Commissioner of Patents and Trademarks*